United States Patent [19]

Opel

[11] Patent Number: 5,555,502
[45] Date of Patent: Sep. 10, 1996

[54] DISPLAY AND CONTROL APPARATUS FOR THE ELECTRONIC SYSTEMS OF A MOTOR VEHICLE

[75] Inventor: George E. Opel, Ambler, Pa.

[73] Assignee: GEO Ventures, Ambler, Pa.

[21] Appl. No.: 498,362

[22] Filed: Jul. 5, 1995

Related U.S. Application Data

[63] Continuation of Ser. No. 240,638, May 11, 1994, abandoned.

[51] Int. Cl.$^6$ .................................................. B62D 33/073
[52] U.S. Cl. .............................. 364/424.05; 364/424.01
[58] Field of Search ............................................ 364/424.01

[56] References Cited

U.S. PATENT DOCUMENTS

| | | | |
|---|---|---|---|
| 4,177,498 | 12/1979 | Weitz | 361/647 |
| 4,435,648 | 3/1984 | Goode, III | 364/424.05 |
| 4,578,591 | 3/1986 | Floyd et al. | 370/10.1 |
| 4,630,043 | 12/1986 | Haubner et al. | 340/825.57 |
| 4,642,770 | 2/1987 | Shirley | 364/424 |
| 4,658,943 | 4/1987 | Nishikawa et al. | 192/0.073 |
| 4,707,788 | 11/1987 | Tashiro et al. | 364/424 |
| 4,731,769 | 3/1988 | Schaefer et al. | 364/424.05 |
| 4,786,895 | 11/1988 | Castaneda | 345/160 |
| 4,787,040 | 11/1988 | Ames et al. | 364/424.01 |
| 4,792,783 | 12/1988 | Burgess et al. | 370/10.1 |
| 4,845,620 | 7/1989 | Parker | 364/424.05 |
| 4,899,138 | 2/1990 | Araki et al. | 345/175 |
| 5,091,856 | 2/1992 | Hasegawa et al. | 364/424.05 |
| 5,107,425 | 4/1992 | Donges et al. | 364/424.03 |
| 5,122,961 | 6/1992 | Toyama et al. | 364/449 |

*Primary Examiner*—Kevin J. Teska
*Assistant Examiner*—Dan Fiul
*Attorney, Agent, or Firm*—LaMorte & Associates

[57] ABSTRACT

A control system and associated method for assisting the driver of a vehicle in selectively adjusting the various electronic components present within the vehicle. The system includes a microprocessor that is coupled to selected electronic components within the vehicle. A control panel is also coupled to the microprocessor, wherein the control panel contains a plurality of selection keys and at least one tactile control. The driver of the vehicle can select an adjustable feature from any component in the vehicle by utilizing the selection keys on the control panel. Once a specific adjustable feature is selected, the driver can selectively adjust that feature using the tactile controls present on the control panel. As a result, one set of tactile controls can be used to selectively adjust every adjustable electronic feature contained within the automobile.

14 Claims, 12 Drawing Sheets

FUEL — 76

1. GALLONS IN TANK ○
2. PERCENT CAPACITY ○
3. AVERAGE MILES PER GAL. ○
4. MILES TO EMPTY ○
5. TRIP CONSUMPTION ○
6. ESTIMATED TIME OF ARRIVAL ○
7. ○
8. ○
9. ○
0. ○
*. ○
. ○
A. ○
B. ○

FIG-7

WIPERS — 77

1. FRONT ●
2. REAR ○
3. LOW SPEED ○
4. HIGH SPEED ●
5. INTERMITTENT OPERATION ○
6. WASH ●
7. ○
8. ○
9. ●
0. ○
*. ○
. ○
A. ○
B. ○

AUXILIARY-1 (96)

- ○ 1. LEFT OUTSIDE MIRROR
- ○ 2. RIGHT OUTSIDE MIRROR
- ○ 3. MOON ROOF
- ○ 4. EMERGENCY ALARM
- ○ 5. FUEL CAP RELEASE
- ○ 6. HOOD RELEASE
- ○ 7. TRUNK LID RELEASE
- ○ 8. SEAT ADJUSTMENTS
- ○ 9. REAR MESSAGE BOARD
- ○ 0. COMPASS SETTING
- ○ *. HEATED WINDSHIELD
- ○ #. HEATED REAR WINDOW
- ○ A.
- ○ B.

FIG-17

AUXILIARY-2 (97)

- ○ 1. LOAD LEVELER
- ○ 2. DRIVER'S SEAT
- ○ 3. PASSENGER SEAT
- ○ 4. POWER WINDOWS
- ○ 5. POWER LOCKS
- ○ 6.
- ○ 7.
- ○ 8.
- ○ 9.
- ○ 0.
- ○ *.
- ○ #.
- ○ A.
- ○ B.

DISPLAY AND CONTROL APPARATUS FOR THE ELECTRONIC SYSTEMS OF A MOTOR VEHICLE

This is a Continuation in Part, Application under 37 C.F.R. 1.62 of prior Ser. No. 08/240,638, field on May 11, 1994, entitled DISPLAY AND CONTROL APPARATUS FOR THE ELECTRONIC SYSTEMS OF A MOTOR VEHICLE now abandoned.

BACKGROUND OF THE INVENTION

I. Field of the Invention

The present invention relates to a control device and display for controlling and monitoring most all of the electronic components contained within a motor vehicle. More particularly, the present invention relates to a central menu-driven programmable control unit with a central display monitor whereby the driver of a motor vehicle can selectively monitor and change numerous independent electronic systems utilizing a single set of controls.

II. Prior Art Statement

Most modern automobiles utilize electronic devices that rely upon a human operator for adjustment. The radio settings, windshield wiper speed, temperature controls and the like are a few examples. As new technologies are invented and added to the automobile, it seems as though the number of controls that require selective adjustment is forever increasing. A major problem, therefore, exists in that there are no standard controls or procedures for operating and adjusting the various electronic components designed into the different makes and models of automobiles. As a result, if a person is driving an unfamiliar automobile, that person must often search for the various controls, thereby diverting his/her attention from the road. Since the operation of many devices is condition specific, such as windshield wipers, many drivers must search for the various electronic controls while the automobile is moving through traffic. In the case of the sudden need for lights, windshield wipers, defroster, four wheel drive controls and the like, the driver must quickly find the proper control or else the lack of such elements may themselves cause an accident. To further complicate matters, the controls of most every make of automobile are positioned in different places, therefore no matter how experienced a person is, if that person is driving an unfamiliar automobile, that person must still randomly search for the needed controls. Typically, luxury automobiles have more electronically controlled features than do economy automobiles. In many instances, the instrument panels of the automobile are so cluttered, and the printing on the controls is so small, that it becomes very difficult to safely adjust any of the electronic features without first stopping the automobile. In the dark, many of the instrument controls are not properly lit. Furthermore, people who do not need glasses to drive but do need glasses to read small text must put on their glasses to find the needed controls. This adversely effects the vision needed for driving.

The inability of drivers to efficiently control the various operations of their automobiles, combined with distractions created by searching for the controls, has undoubtedly resulted in numerous accidents and injuries. As a result, there exists a real need for a vehicle control system that can be operated efficiently and without distraction by an unfamiliar driver.

In the prior art, there have been many attempts made to make the electronic controls of an automobile more simple to use. However, in most every case, the improved controls are custom made for a single make and model of automobile, thereby providing no appreciable benefits to a person not familiar with that specific make and model. These prior art systems do help in operating the electronic controls of an automobile but do embody certain disadvantages, as will be explained in the exemplary prior art cited below.

U.S. Pat. No. 4,787,040 to Ames et al., entitled DISPLAY SYSTEM FOR AUTOMOTIVE VEHICLE, discloses a programmable system controller to assist in the operation of several electronic systems within an automobile. The Ames patent essentially places a personal computer within an automobile, whereby complex software can be selectively read from memory and run. The Ames system utilizes a complex data processing keyboard, a touch screen and many of the electronic components, such as the radio, cellular telephone and the like, still have their own controls. Consequently, although the Ames system enables many different functions to be rapidly performed, the Ames system is far more complex than the system of a typical automobile. As a result, an unfamiliar person driving an automobile for the first time that contains a system such as the Ames system would be more distracted and confused than helped.

U.S. Pat. No. 5,091,856 to Hesagawa et al., entitled CONTROL APPARATUS FOR AUTOMOBILES, discloses a central control unit that is coupled to many of the electronic components present within an automobile. However, the purpose of the control unit is to adjust the various electronic components to a predetermined setting depending upon what person is driving the automobile. The control unit does not replace the need to individually adjust each electronic feature at their point of assembly into the dashboard and therefore does not solve the problems of confusion and distraction previously described.

Lastly, in U.S. Pat. No. 4,630,043 to Haubiner et al., entitled VEHICLE DATA ACQUISITION AND DASHBOARD DISPLAY SYSTEM, a system is disclosed that displays many of the electronic features of the automobile on a common central display. However, the features displayed are for informational purposes only, and those features cannot be controlled at the central location.

As such, the prior art fails to disclose a central control system for the electronic components of an automobile, wherein each and every adjustable feature of those electronic components can be simply controlled by a single set of centrally located controls.

It is, therefore, an objective of the present invention to provide an automobile control system that has a single set of controls, wherein the controls can be used to control every adjustable electronic component within the automobile.

It is a further objective of the present invention to provide a single electronic display that is easily viewed by the driver of the automobile and selectively displays the status of each adjustable electronic component to the driver in an easily viewed and non-distracting manner.

SUMMARY

The present invention is a control system and associated method for assisting the driver of a vehicle in selectively adjusting the various electronic components present within the vehicle. The system includes a microprocessor that is coupled to selected electronic components within the vehicle. A control panel is also coupled to the microprocessor, wherein the control panel contains a plurality of selection keys and at least one tactile control. The driver of the vehicle can select an adjustable feature from any component in the vehicle by utilizing the selection keys on the control panel. Once a specific adjustable feature is selected, the driver can selectively adjust that feature using the tactile controls present on the control panel. As a result, one set of tactile controls can be used to selectively adjust every adjustable electronic feature contained within the automobile.

An electronic display is also coupled to the microprocessor. The electronic display displays all the adjustable electronic features to the driver in a menu driven format. Once a specific adjustable electronic feature is selected, the electronic display displays the current operational status of the selected feature to the driver so that the driver is provided with all the information needed to make the desired adjustment.

BRIEF DESCRIPTION OF THE DRAWINGS

The invention will be more fully understood by referring to the following detailed specification, the above background and summary, and the claims set forth herein, when taken in conjunction with the drawings appended hereto wherein:

DETAILED DESCRIPTION OF THE INVENTION

The present invention is a control system for monitoring and controlling most every adjustable electronic component in a manned vehicle. As such, the present invention can be used in many applications, such as an airplane or boat, where selected electronic components must be periodically adjusted to meet changing needs. However, the present invention control system is particularly advantageous in controlling and monitoring the various electronic components contained within a passenger automobile. Consequently, the below described drawings are directed toward one exemplary embodiment wherein the present invention is used in conjunction with a passenger automobile.

Figure 1:
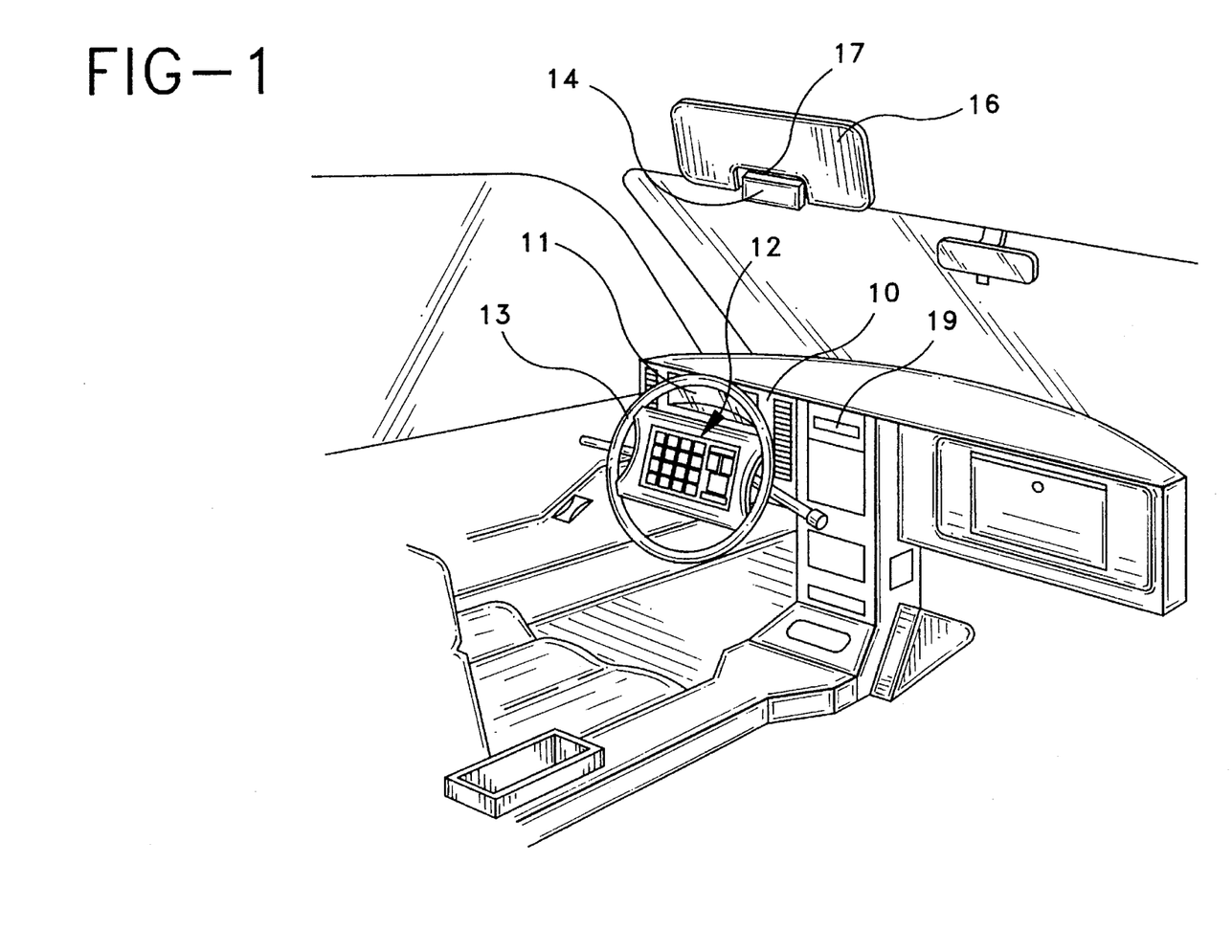
FIG. 1 is a perspective view of the interior of an automobile to show one preferred installation application of the present invention system and to promote both consideration and discussion.

Referring to FIG. 1, an exemplary embodiment of the present invention control system is shown in an application within the steering wheel 13 of a typical passenger automobile. On the steering wheel 13 is positioned a control panel 12 that contains various push button controls. As will be later explained, the control panel 12 can be utilized to control most every adjustable electronic feature of the automobile including the lights, temperature control, wipers, sound system, cruise control, seat adjustments, mirror adjustments, anti-theft systems, clock, cellular telephone and the like. The use of a single control panel 12 eliminates the need for the individual electronic components to have their own controls. Accordingly, each of the electronic components may or may not have individual controls. Should the individual electronic components have their own controls, such controls would be secondary to the controls on the control panel 12. As such, the passenger could adjust the various electronic components without having to engage the control panel 12 and disturb the driver.

In the shown embodiment, the control panel 12 is located in the center of the steering wheel 13. This position, however, is merely exemplary and the control panel 12 can be positioned in any ergonomically efficient position. For instance, the control panel 12 can be located behind the steering wheel 13 on the dashboard 10 or may be on a bracket that extends from the steering column. Any such position wherein the control panel 12 is both easily viewed and easily reached may be used. Should the control panel be located on the steering wheel 13, it should be attached in such a manner that the control panel 12 does not interfere with the operation of any air bag device that may be present.

An electronic display 14 is also positioned within the automobile so that it is easily viewed by the driver of the automobile. In the shown embodiment, the electronic display 14 is positioned in the area of the driver's sun visor 16. The electronic display 14 is angled toward the driver so as to be easily viewed. A cut-out recess 17 is formed in the driver's sun visor 16 whereby the electronic display 14 can still be viewed by the driver even when the sun visor 16 is positioned downwardly over the windshield. The positioning of the electronic display 14 in the region of the sun visor 16 is also merely exemplary. The electronic display 14 can be mounted on top of the dashboard, in the lower left hand corner of the windshield, at the top of the windshield, in the main instrument panel or at any other position that can be quickly viewed without the driver's having to look far away from the center of the windshield. Similarly, the display may be a head-up display that is projected onto the windshield. In the shown embodiment, the electronic display 14 is located adjacent to the sun visor 16 and the control panel 12 is located in the center of the steering wheel 13. As a result, the driver need only glance slightly upwardly to view the display 14 and glance slightly downwardly to engage the controls at the control panel 12. This provides an ergonomical configuration that limits the time the driver's vision is distracted away from oncoming traffic.

An optional secondary display 19 may be placed within the dashboard 10 or at any other point that is easily viewed. As will be later explained, the secondary display 19 may display information such as the time, day and date that is of general interest to the driver but is of no importance to the overall operation of the automobile.

Figure 2:
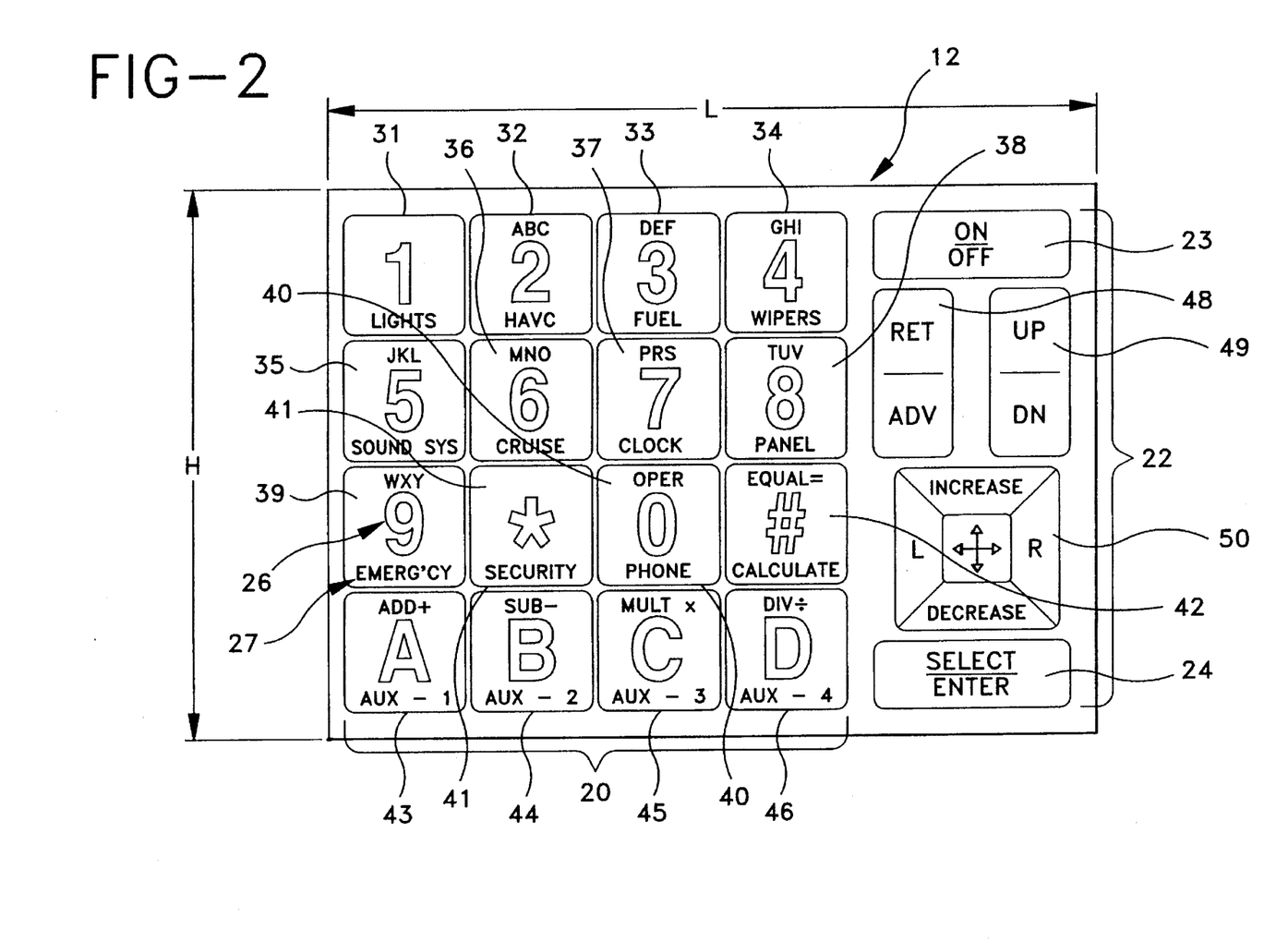
FIG. 2 is a front view of one preferred embodiment of the control panel of the present invention.

Referring to FIG. 2, it can be seen that the control panel 12 includes an alphanumeric keypad 20 containing sixteen keys. Next to the Keypad 20 on the control panel 12 are five selective control buttons 22. The control panel 12 has a length L of between four inches and six inches and a height H of between three inches and five inches. This provides for a control panel 12 of between twelve and thirty square inches. As a result, there is plenty of room on the control panel 12 to place the twenty one keys and buttons. Consequently, each of the keys and buttons may be large having easily engaged surfaces with large, easy to read text and numbers displayed on the buttons. This makes the control panel 12 very easy to view and engage, even if the driver of the automobile does not have perfect eyesight. In a preferred embodiment, the keys and buttons on the control panel 12 are illuminated, so as to make each of the keys and buttons easy to see in the dark.

In the shown embodiment, sixteen alphanumeric keys are present. This number may be varied as desired. However, a minimum of twelve keys is preferred so that the keypad 20 may at least mimic the layout of a typical touch-tone telephone and function in the same manner as a typical touch-tone keypad. Each of the keys on the keypad 20 has an alphanumeric value and a corresponding control function. The alphanumeric value is shown as a character 26 largely displayed in the center of each key. The control function of each key is displayed as text 27 written below the central alphanumeric character 26. The sixteen keys contained on the shown keyboard 20 include the LIGHTS/1 key 31, the HVAC/2 key 32, the FUEL/3 key 33, the WIPERS/4 key 34, the SOUND SYSTEM/5 key 35, the CRUISE/6 key 36, the CLOCK/7 key 37, the PANEL/8 key 38, the EMERGENCY/9 key 39, the PHONE/0 key 40, the SECURITY/* key 41, the CALCULATE/# key 42, and the A, B, C, D auxiliary keys 43, 44, 45, 46. The function of each of the keys on the keypad 20 will be later described.

The five selective control buttons 22 that are adjacent to the alphanumeric keypad 20 include an ON/OFF button 23, a SELECT/ENTER button 24, a RETURN/ADVANCE button 48, an UP/DOWN button 49 and a four-way button 50 having a LEFT/RIGHT—INCREASE/DECREASE designation. The purposes of these five selective control buttons will also later be described Referring to FIG. 3, a schematic of the present invention system is shown. As can be ascertained, the control panel 12 and the electronic display 14 are coupled to a central processing unit (CPU) 51. Additionally, every adjustable electronic component of the automobile is also coupled to the CPU 51 via a main bus 52. The CPU 51 is capable of controlling every adjustable feature of each of the electronic components. Each electronic component can be individually wired to the CPU 51, however the use of a main bus 52 is preferred in order to reduce the amount of wiring and simplify the installation of the overall system into an automobile.

Figure 3:
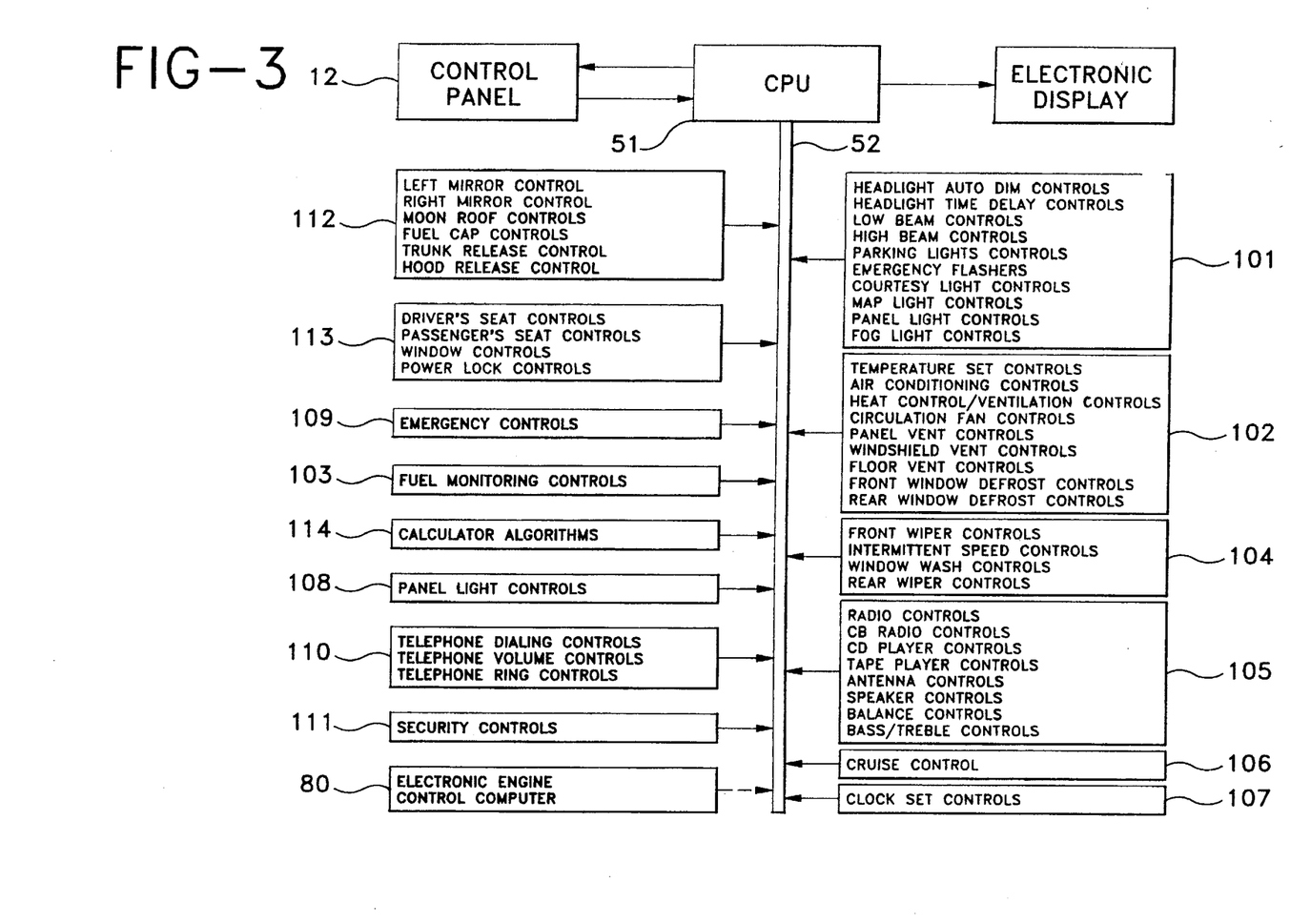
FIG. 3 is a schematic block diagram showing the systems in the automobile controlled by the present invention system.

The electronic components coupled to the CPU 51 are arbitrarily grouped into a plurality of subgroups that are labeled 101–114. Each of the subgroups contain the adjustable electronic components from one device or from related systems. Each of these subgroups also corresponds to the dedicated control of one of the keys present on the alphanumeric keypad 20 (FIG. 2). In other words, each of the keys on the alphanumeric keypad 20 (FIG. 2) governs the controls of all the electronic components contained within one of the subgroups 101–114. The use of sixteen keys on the keypad 20 is arbitrary and was selected merely for the purposes of illustration. It will therefore be understood that the number of stated subgroups is similarly arbitrary and may be varied should the number of keys on the keypad 20 be varied.

OPERATION

Figure 4:
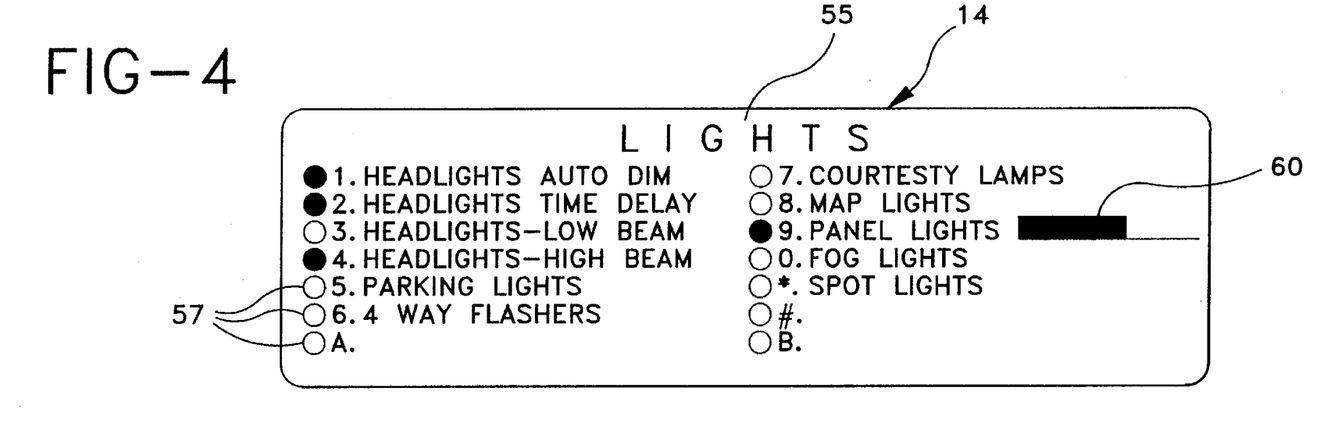
FIG. 4 shows the light system control menu display.

When the ignition key is turned on, the alphanumeric keypad 20 (FIG. 2) is activated and the secondary display 19 (FIG. 1) is illuminated to show the date, time and day. To operate the system of the present invention, the driver of an automobile presses one of the buttons present on the alphanumeric keypad 20 (FIG. 2) that corresponds to a desired subsystem. Once the key is selected, a control menu is displayed that enables the driver to easily select and then control any electronic component contained within that control menu using the control buttons 22 on the control panel 12. Looking at FIG. 2, suppose a driver were to select the LIGHTS/1 key 31 by pressing the LIGHTS/1 key 31 and then pressing the SELECT/ENTER button 24 to enter the selection. A menu graphic would then be displayed on the electronic display 14 as is shown by FIG. 4. Referring to FIG.4, it can be seen that once the LIGHTS/1 key 31 is selected, the LIGHTS menu 55 is displayed on the electronic display 14. The LIGHTS menu 55 contains sixteen menu choices. The number of menu choices in the menu 55 corresponds in number to the number of alphanumeric keys on the keypad 20 (FIG. 2). As such, should the number of keys on the keypad 20 be varied, the number of menu choices would also change.

The menu choices contained in the LIGHT menu 55 correspond to the variable features for the electronic components contained within the LIGHT subgroup 101 shown in FIG. 3. When a menu is first displayed, the current status of the electronic components contained within that menu is displayed. Menu selections that only have ON/OFF functions are given circular ON/OFF indicators 57. As is shown, when the LIGHT menu 55 of FIG. 4 is first displayed, the circular indicators 57 for "1. HEADLIGHTS AUTO DIM", "2. HEADLIGHTS TIME DELAY", "4. HEADLIGHTS-HIGH BEAM"and "9. PANEL LIGHTS"are all indicated as being "ON". To control any component listed in the menu 55, the driver need only select that component by pressing the appropriate number on the keypad 20 (see FIG. 2). For instance, in order to control the parking lights of the automobile, the driver would press the SOUND SYSTEM/5 key 35 on the keypad 20 (see FIG. 2). This key has a large number "5" printed upon it which corresponds to the option on the menu 55 "5. PARKING LIGHTS". Once the menu selection is made, the selective control buttons 22 (FIG. 2) are enabled, whereby the selective control buttons 22 can be used to adjust the selective component. For example, if a person selects "5. PARKING LIGHTS" from the LIGHTS menu 55, the driver is then directly in control of the parking lights of the automobile. The parking lights have no adjustments other than ON and OFF. As such, the variable control buttons such as the UP/DOWN button 49 and FOUR-WAY button 50 need not be used. The parking lights can be turned ON or OFF by depressing the ON/OFF button 23 on the control panel 12 (see FIG. 2). If turned on, the circular ON/OFF indicator 57 lights and provides a visual indication as to the status of the parking lights.

Electronic components that are adjustable other than being turned ON and OFF can be adjusted in one of two manners. Suppose a person looking at the LIGHTS menu 55 wanted to adjust the panel lights in the automobile. That person would see "9. PANEL LIGHTS" listed in the LIGHTS menu 55. As such, that person would press the EMERGENCY/9 key 39 on the keypad 20 (see FIG. 2). This key has a large number "9" printed upon it which corresponds to the option on the menu 55 entitled "9. PANEL LIGHTS". Once the menu selection is made, the driver may press the "INCREASE" or "DECREASE" portions of the FOUR-WAY button 50 (see FIG. 2) which would act to increase or decrease the brightness of the panel lights. The brightness of the panel lights is displayed as a histogram 60 next to the menu selection. As such, the driver can visualize the changes being made. As can be seen from the above example, the first way to adjust an adjustable electrical component is by selecting that electrical component from the appropriate menu and manipulating the appropriate selective control buttons 22 to effect the desired change.

A second method to change an adjustable electronic component is by programming the CPU 51 (FIG. 3) to make the change. For example, suppose a driver wants to keep the headlights of the automobile on for an additional three minutes after turning off the automobile. The driver would then select the LIGHT menu 55 as previously described. The driver would then see the menu selection entitled "2. HEADLIGHTS TIME DELAY". The driver would push the HVAC/2 key 32 to select that menu option. Once selected, the electronic display may display a default value of thirty seconds. This may be altered by pressing the "INCREASE" portion of the FOUR-WAY button 50 or the value of three minutes may be directly entered. To directly enter a numerical value, the driver need only press the desired value into the keypad 20. As a result, by pressing three—asterisk—zero and then the SELECT/ENTER button 24, the value of 3.0 minutes may be entered. The asterisk is used as a decimal point to distinguish three minutes from thirty minutes.

Figure 5:
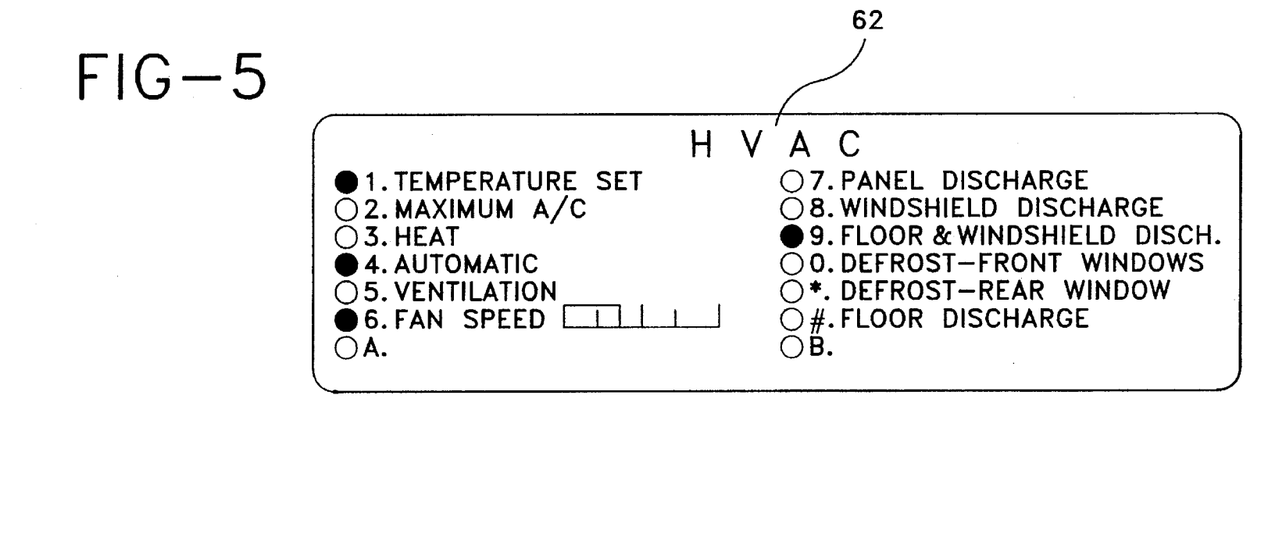
FIG. 5 shows the heating ventilation and air conditioning menu display.

As has been previously explained, the menu 55 shown in FIG. 4 is the LIGHTS menu that initially is displayed when a driver want to adjust the lights and selects the LIGHTS/1 key 31 is initially selected from the keypad 20. For the purposes of further example, assume the driver wants to turn on the rear defroster of the automobile. The driver would initially select the HVAC/2 key 32 on the keypad 20 (see FIG. 2). The HVAC menu 62 of FIG. 5 would then be displayed on the electronic display 14 (see FIG. 3). The HVAC menu 62 gives the driver an overview of all the adjustable electronic components contained within the HEATING, VENTILATION AND AIR CONDITIONING subgroup 102 in FIG. 3. Referring to FIG. 5 in conjunction with FIG. 2, it can be seen that upon viewing the HVAC menu 62, the driver would see the menu selection captioned "*. DEFROST—REAR WINDOW". By depressing the SECURITY/* key 41 on the keypad 20, the driver would select the REAR WINDOW DEFROST option. The driver would then depress the ON/OFF button 23 to turn on the rear defroster.

As can be seen from the above examples, the present invention system works by using the alphanumeric keypad 20 to select a menu and then select a menu choice contained within one of those menus. Once a menu selection is chosen, the ON/OFF button 23 is used to activate and deactivate the selected electronic component. If that component is variable, the UP/DOWN button 49, RETURN/ADVANCE button 48 and/or FOUR-WAY button 50 can be used to make the selected variations in the electronic components. Many electronic components merely require an increase or decrease adjustment. As such, the use of the FOUR-WAY button 50 is sufficient to make the changes. Other specialized pieces of electronic equipment, such as the radio, tape player and the like require more sophisticated adjustments.

Figure 6:
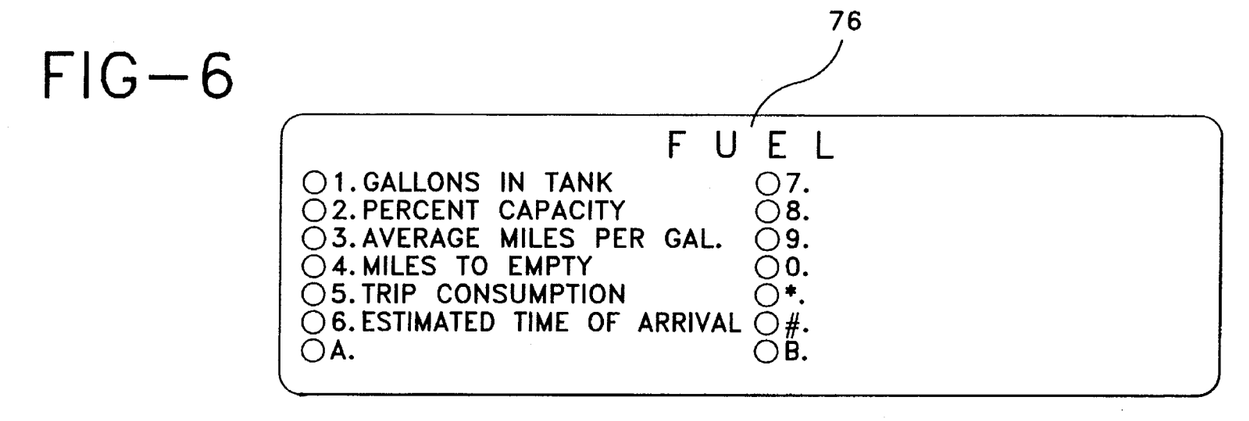
FIG. 6 shows the fuel control menu display.
Figure 7:
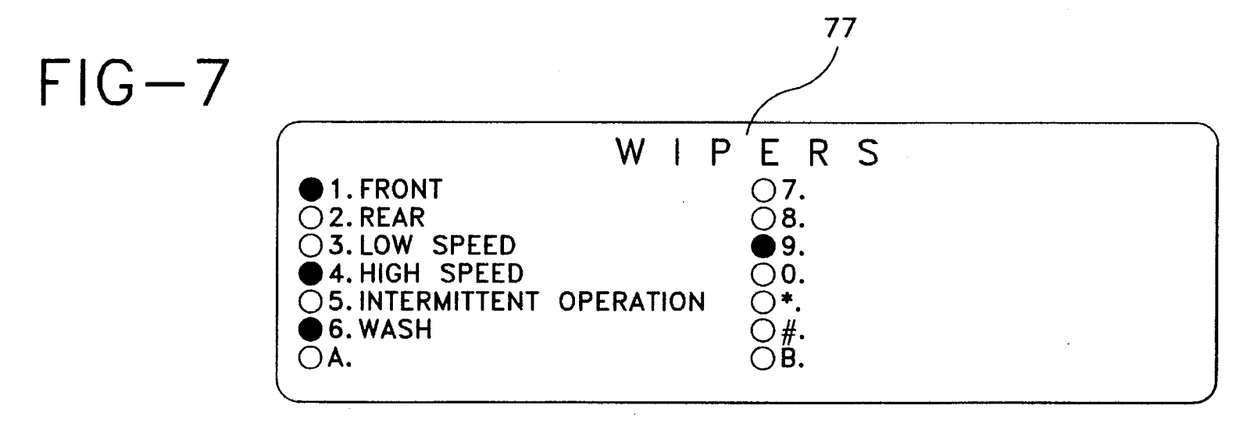
FIG. 7 shows the wiper control menu display.
Figure 8:
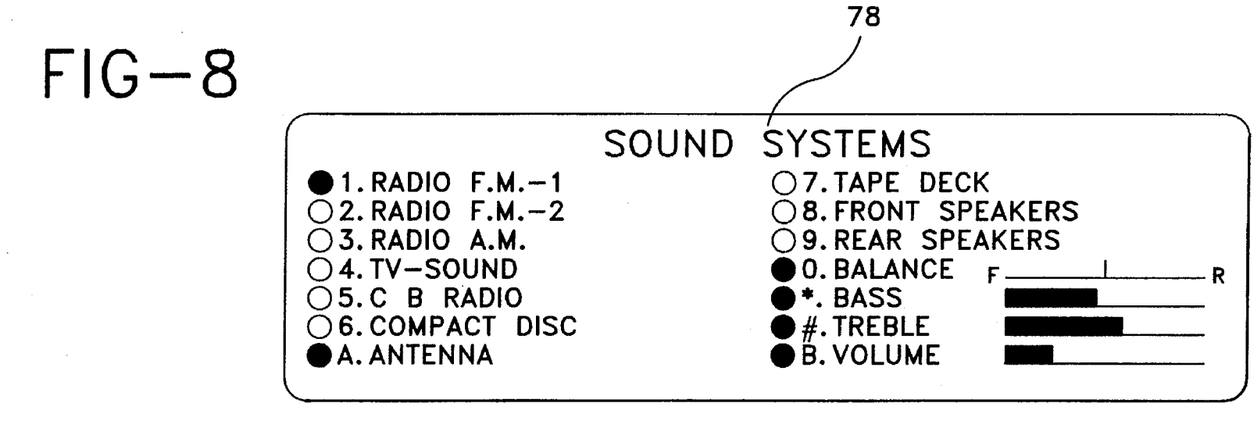
FIG. 8 shows the sound system control menu display.
Figure 9:
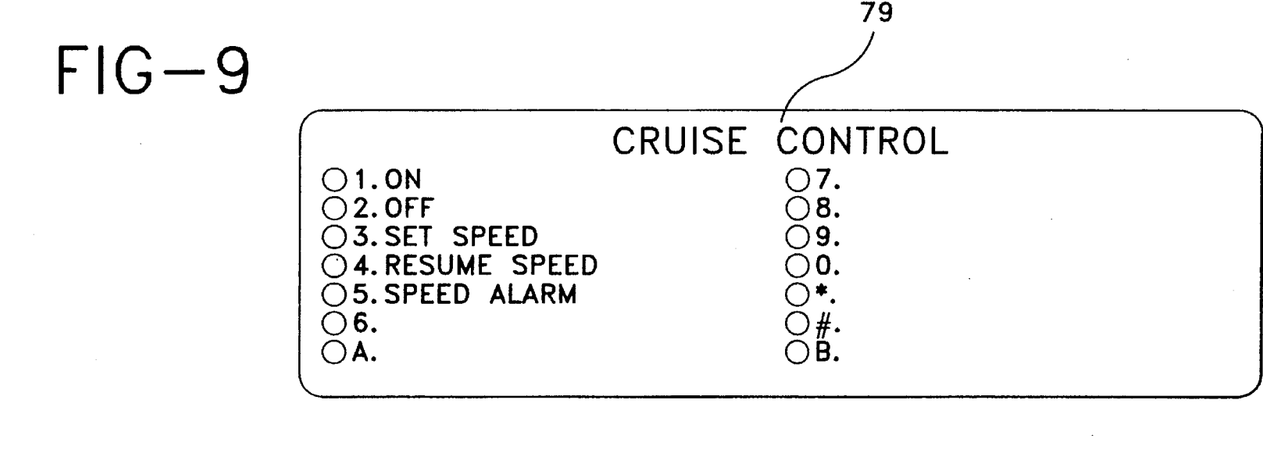
FIG. 9 shows the cruise control menu display.
Figure 10:
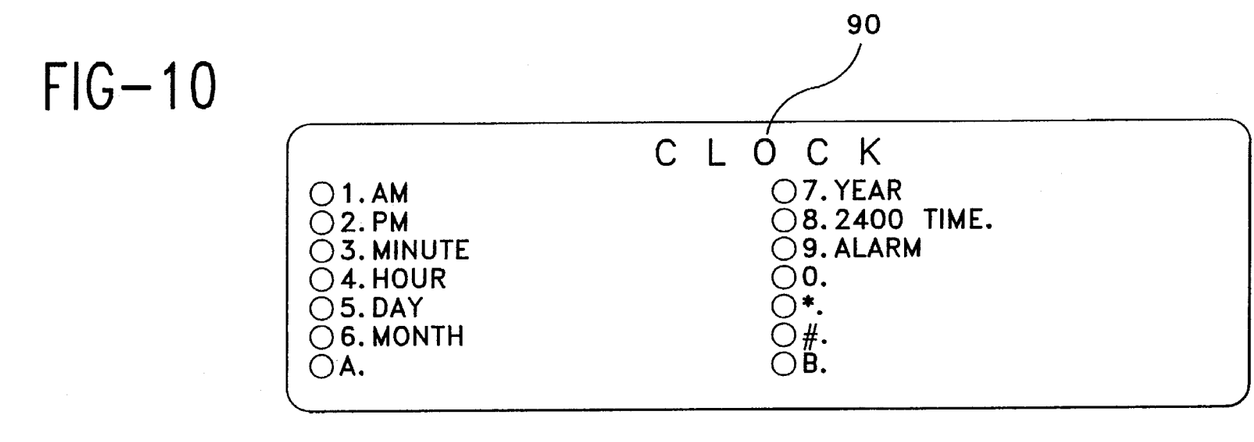
FIG. 10 shows the clock control menu display.
Figure 11:
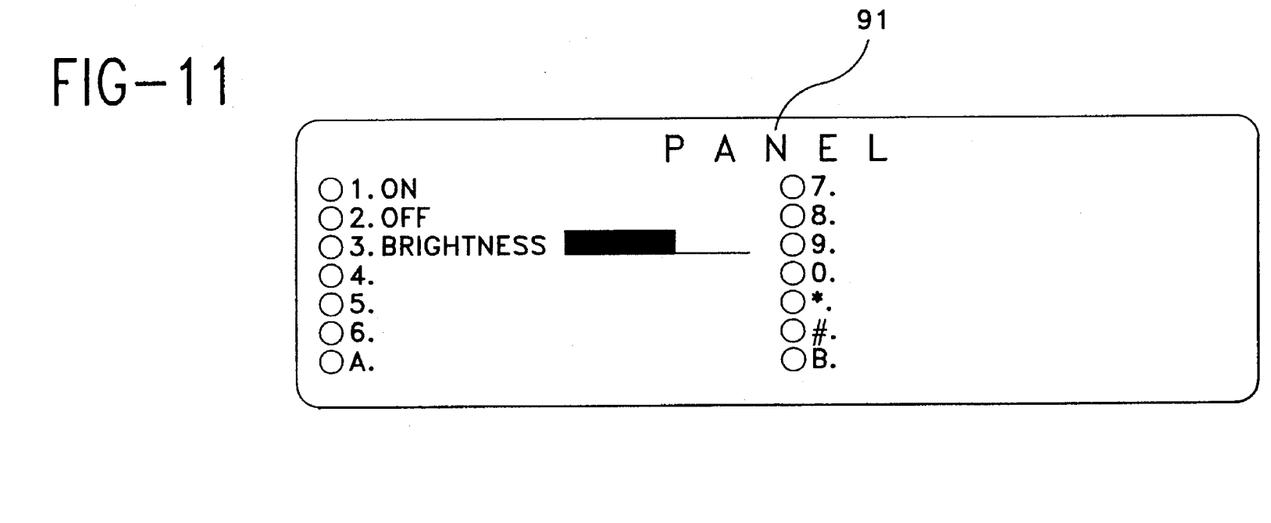
FIG. 11 shows the panel control menu display.
Figure 12:
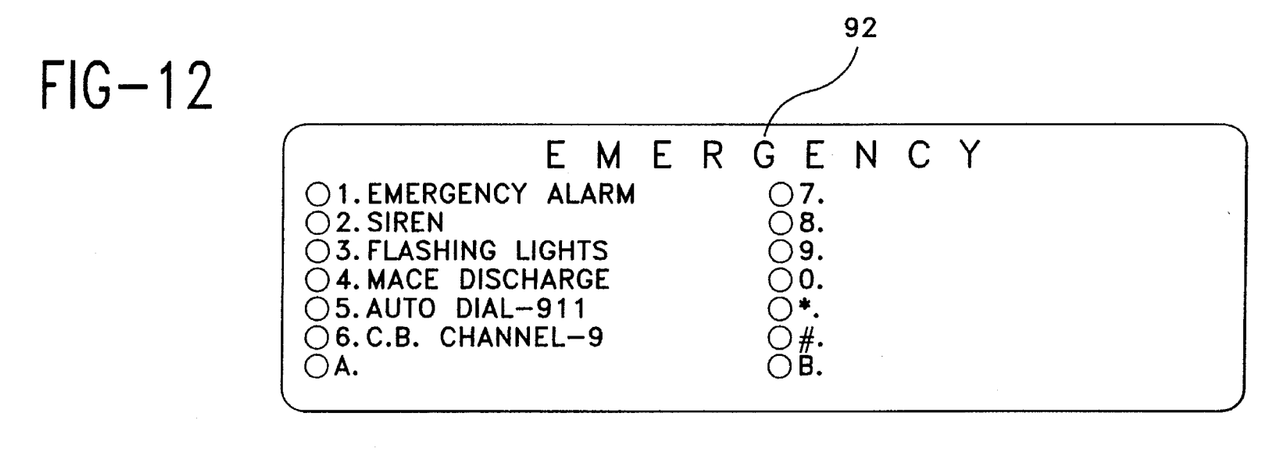
FIG. 12 shows the emergency control menu display.

FIGS. 6–18 show the other various menus that can be displayed should the driver select one of the keys on the alphanumeric keypad 20. FIG. 6 shows the FUEL menu 76 that corresponds to the adjustable components present within subgroup 103 in FIG. 3. FIG. 7 shows the WIPER menu 77 that corresponds to the adjustable component present within subgroup 104 in FIG. 3. FIG. 8 shows the SOUND SYSTEM menu 78 that corresponds to the adjustable components present within subgroup 105 in FIG. 3. FIG. 9 shows the CRUISE CONTROL menu 79 that corresponds to the adjustable components present within subgroup 106 in FIG. 3. FIG. 10 shows the CLOCK CONTROL menu 90 that corresponds to the adjustable components present within subgroup 107 in FIG. 3. FIG. 11 shows the PANEL menu 91 that corresponds to the adjustable components present within the subgroup 108 in FIG. 3. FIG. 12 shows the EMERGENCY menu 92 that corresponds to the adjustable components present within subgroup 109 in FIG. 3. With the current rash of car jackings, accidents, medical problems and the like, the EMERGENCY/9 key 39 (FIG. 2) may be tinted a red color for quick identification. By pressing the EMERGENCY/9 button, the CPU 51 would immediately initiate any and all of the protective systems installed in the vehicle. These features might include an audible alarm (horns or sirens), flashing of all exterior lights, automatic locking of all doors, automatic raising of the windows, and the like. If a cellular phone and/or CB radio are installed, 911 would be automatically dialed and/or channel 9 of the CB radio would be activated. An alternative option might even include a spray nozzle for discharging a skin irritant with an identifying dye.

Figure 13:
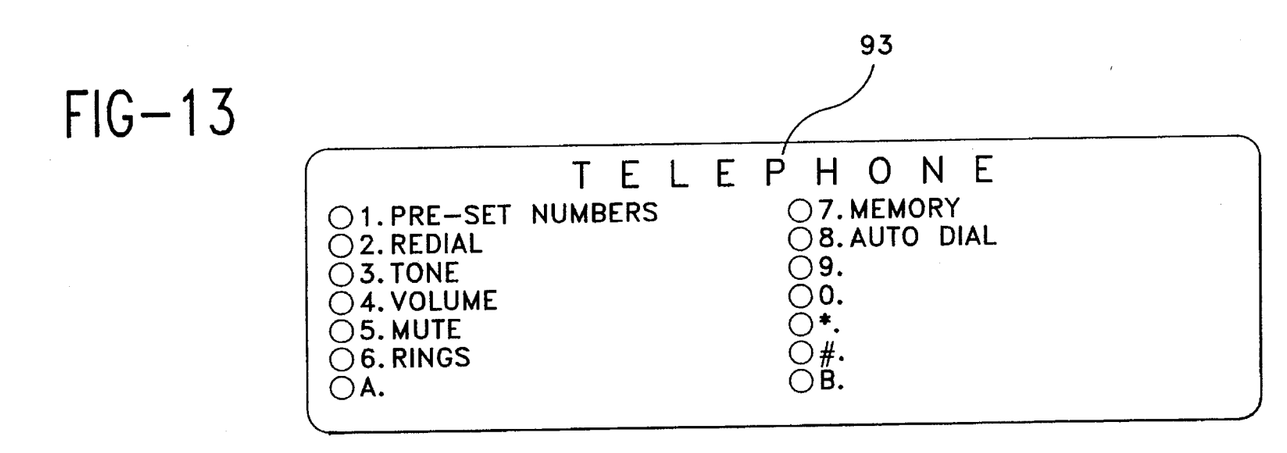
FIG. 13 shows the security control menu display.
Figure 14:
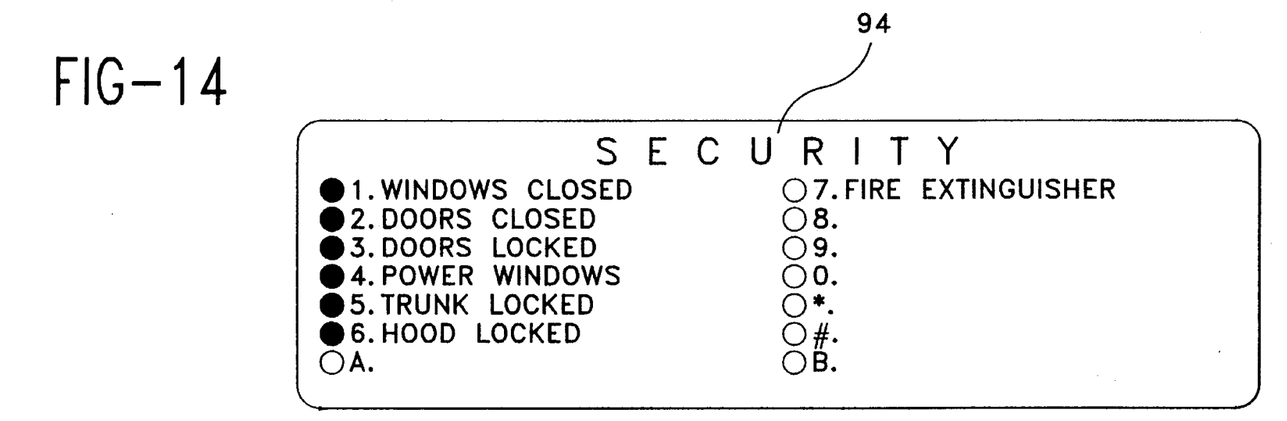
FIG. 14 shows the telephone control menu display.
Figure 15:
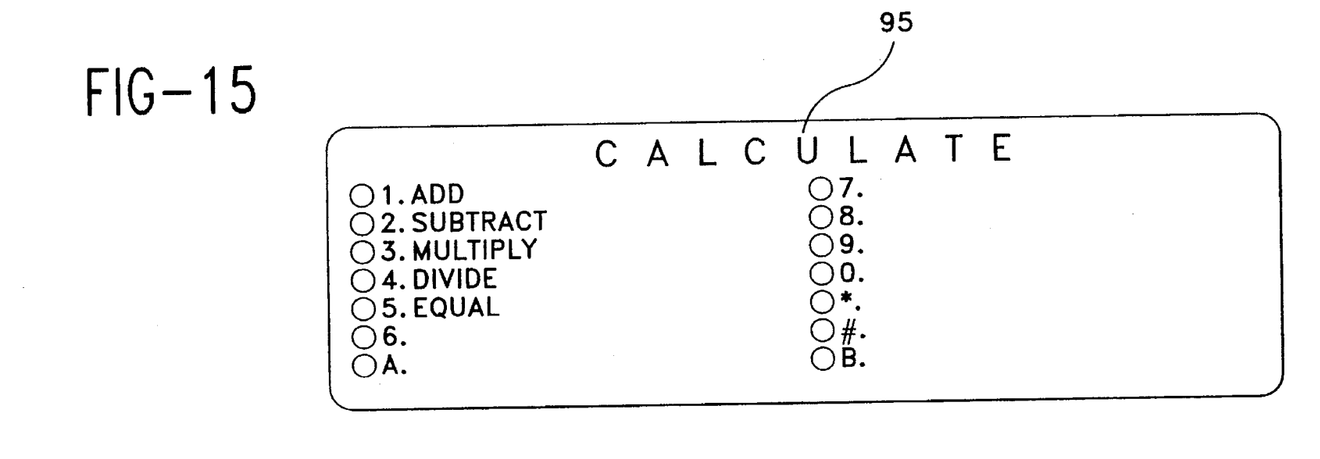
FIG. 15 shows the calculator control menu display.
Figure 16:
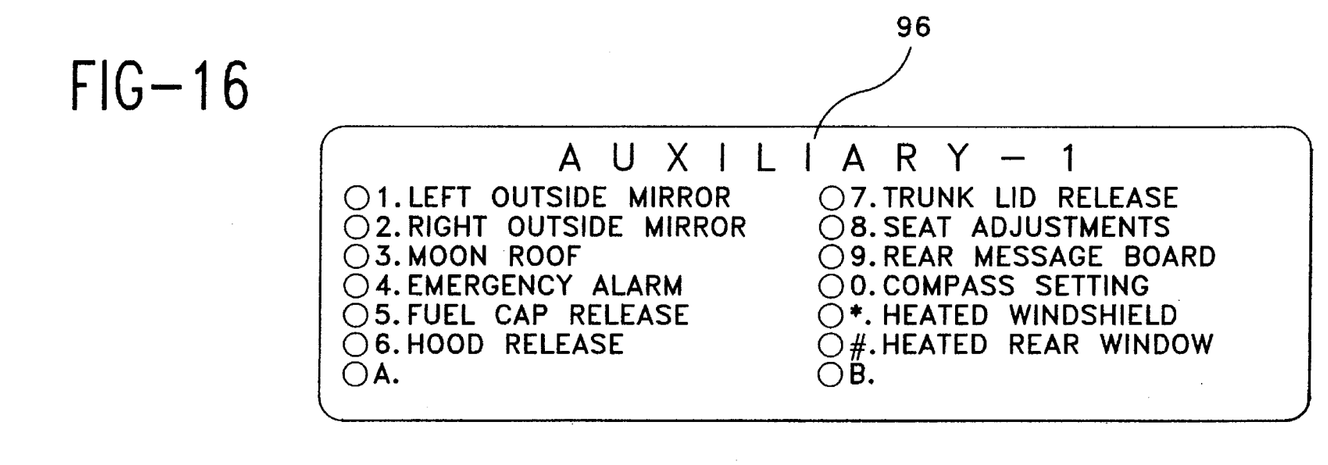
FIG. 16 shows the first auxiliary control menu display.
Figure 17:
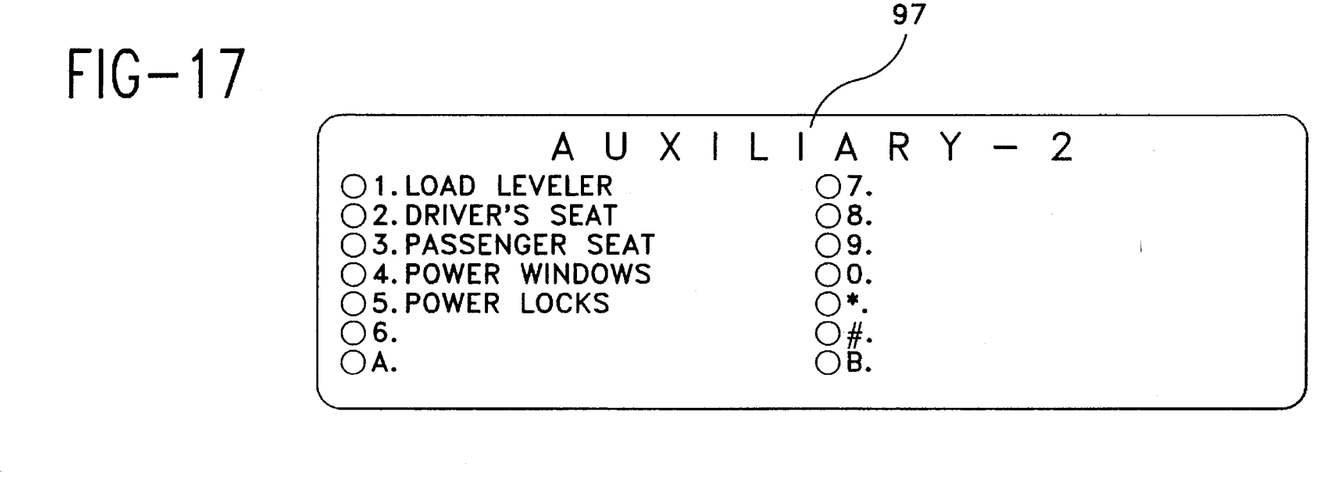
FIG. 17 shows the second auxiliary control menu display.
Figure 18:
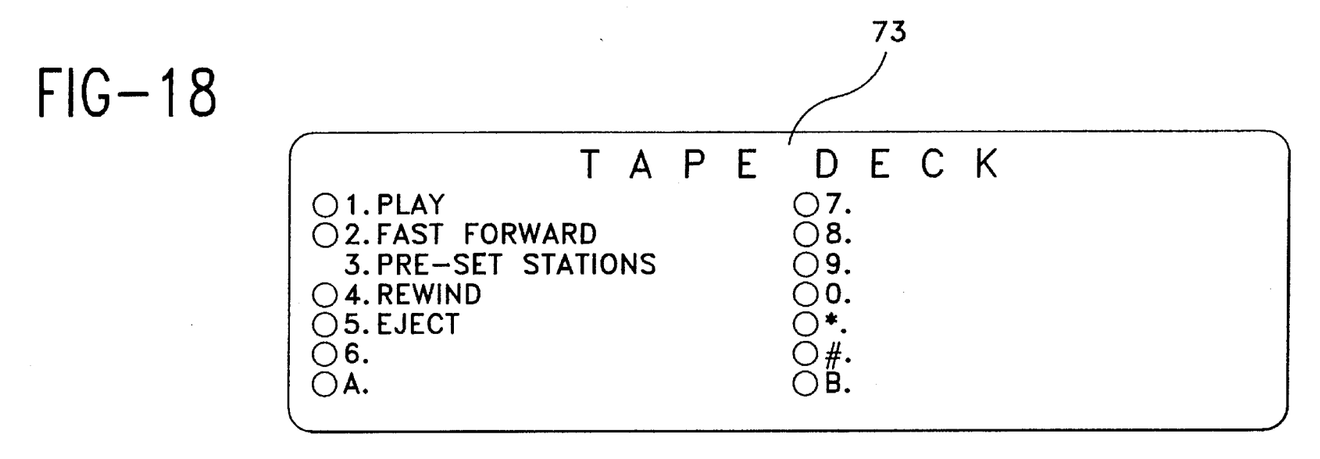
FIG. 18 shows a submenu for the tape deck feature contained within the sound system control menu of FIG. 8.

FIG. 13 shows the TELEPHONE menu 93 that corresponds to the adjustable components present within subgroup 110 in FIG. 3. If the driver selects the telephone mode, the speaker and the microphone for the telephone are automatically enabled. In a preferred embodiment, the telephone headset may be built into the driver's head rest, thereby enabling the driver to conduct a private conversation even with other people in the automobile. FIG. 14 shows the SECURITY menu 94 that corresponds to the adjustable components present within subgroup 111 in FIG. 3. FIG. 15 shows the CALCULATE menu 95 that controls the various trip algorithm programs contained within CPU 51 as well as the mathematical calculation algorithms of the CPU 51. The CALCULATE menu 95 corresponds to the adjustable components present within subgroup 114 in FIG. 3. FIG. 16 shows the FIRST AUXILIARY menu 96 that corresponds to the adjustable components present within subgroup 112 in FIG. 3. Lastly, FIG. 17 shows the SECOND AUXILIARY menu 97 that corresponds to the adjustable electronic components present within subgroup 113 in FIG. 3.

As has been previously explained any of the menus shown in FIGS. 6–17 can be called to the electronic display 14 (shown in FIG. 1) at any time by pressing the appropriate key on the alphanumeric keypad 20 that corresponds to that menu. For example, pushing the LIGHTS/1 key 31 calls the LIGHTS menu 55 of FIG. 4, pushing the CLOCK/7 key 37 calls the CLOCK menu 90 of FIG. 10, etc. Once a specific menu is selected, the same keys on the alphanumeric keypad 20 are used to choose a menu selection from the displayed menu. Once the menu selection is chosen, the electronic component corresponding to that menu selection can be selectively controlled by the control buttons 22 that are present on the control panel 12 adjacent to the alphanumeric keypad 20 (see FIG. 2).

As has been previously stated, the menu choices presented in any one menu is limited to a number that is equal or less than the number of keys present on the alphanumeric keypad 20. For example, in the shown embodiment, there are sixteen keys present on the alphanumeric keypad 20. As a result, each menu contains no more than sixteen menu selections. Some of an automobile's subsystems contain more than sixteen adjustable components. In such a situation, submenus may be used to present the proper number of menu selections to the driver of the automobile. Take, for example, the sound system of many automobiles. Utilizing the control panel 12 in FIG. 2, the driver of the automobile would push the SOUND SYSTEM/5 key 35 to call the SOUND SYSTEM menu 76 (see FIG. 8) onto the electronic display 14 (see FIG. 1). Referring to FIG. 8, it can be seen that the menu is full, yet not all the possible choices are listed. Consequently, submenus would be used. For instance, suppose the driver selects the menu selection "7. TAPE DECK" from the menu. Upon such a selection, the TAPE DECK submenu 73, shown in FIG. 18, would be displayed upon the electronic display 14 (see FIG. 1). The TAPE DECK submenu 73 contains all the variable controls for the tape deck. The driver may then select one of the choices from the submenu selections by pressing the appropriately numbered key on the keypad 20 (see FIG. 2). Once the submenu selection is chosen, the driver may control the electronic component corresponding to the submenu selection made. The selected electronic component can then be selectively controlled utilizing the control buttons 22 on the control panel 12 (see FIG. 2).

The use of a submenu for the control of the tape deck is merely exemplary and other items such as the radio, CD player and the like may also contain submenus.

Referring back to FIG. 2, it can be seen that the selection control buttons 22 adjacent to the control panel 12 each have indicia that identify those buttons as performing separate dedicated functions. The control buttons 22 are not enabled until an electronic component is selected from a menu or submenu via the alphanumeric keypad 20. However, once a specific electronic component is selected, at least some of the control buttons are activated so that the selected electronic component can be controlled by the driver. The ON/OFF button 23 is enabled for most menu selections, wherein the ON/OFF button 23 is used to turn on or turn off the electric component in question. The UP/DOWN button 49 is enabled with various electronic components such as power locks, power windows, power seats, power mirrors and the like where the electronic component can be physically adjusted either up or down. The RETURN/ADVANCE button 48 is used on components such as the tape player, CD player, radio and the like that require a REWIND/FAST FORWARD type of a control. In some menus, the RETURN/ADVANCE button 48 may also be used to return to the base menu from a submenu. The FOUR-WAY button 50 serves two functions. First, the FOUR-WAY button 50 has an INCREASE/DECREASE control that can be used to control electronic features that have infinite adjustment, such as radio volume, or fixed step adjustments such as fan speed and the like. The driver of the automobile merely presses the INCREASE or DECREASE region of the FOUR-WAY switch 50 to increase or decrease the selected variable function.

The FOUR-WAY button 50 also includes a LEFT/RIGHT control. These regions of the FOUR-WAY button 50 are enabled when the driver selects an electronic component from a menu or submenu that requires LEFT/RIGHT adjustments. The balance of the SOUND SYSTEM speakers, the vent distribution, interior lighting and the like are examples of such components.

Although FIG. 2 shows push button type control buttons 22 on the control panel 12, it should be understood that any other type of tactile control may be used such as knobs, wheels, levers, switches and the like.

Figure 19:
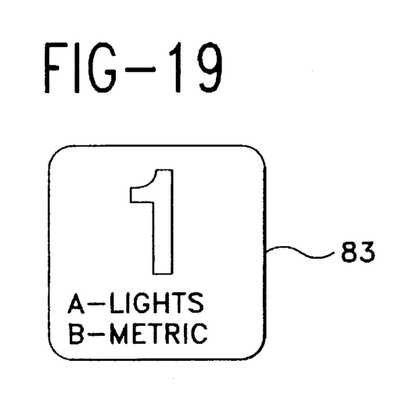
FIG. 19 shows an alternate embodiment of a keypad key.

In the shown embodiment, each key on the keypad 20 only has one system associated with it. The number of keys can be reduced by associating two systems with each key. Referring to FIG. 19 an alternate key 83 is shown. This key 83 has an "A" function and a "B" function. An "A" and "B" button would be added to the key pad, whereby the driver could select the "A" or "B" function by pressing the appropriate key.

A few of the choices provided for within the various menus and submenus do not require the use of the control button 22. Rather, these electronic components are controlled by the input of a numerical value. For instance, if a driver is using the cellular telephone, the number to be dialed requires that numerical values be entered into the telephone. Similarly, if a person is utilizing the control panel as a calculator (see FIG. 15), numerical values must also be entered. For any device that requires the input of a numerical value such as the telephone, calculator, setting the clock, etc., the numerical value is entered by pressing the appropriately numbered key on the keypad 20 and then pressing the SELECT/ENTER button 24 to have the entered number read by the CPU.

In FIG. 1, the electronic display 14 is located in the area of the driver's sun visor. The secondary display 19 is located in the dashboard 10. However, such placements are merely exemplary and the displays may be positioned at any other location that does not require too much eye or head movement for the driver to view the display. Either of the displays can be of any construction such as CRT, LED display, liquid crystal display or electrophoretic display. In an alternate embodiment of the invention, the display 14 can be used not only to view menu selections but also to provide the driver with all needed information as the sole visual display. In such an embodiment, the automobile would have no other instrumentation displays other than the electronic display 14. As can be seen from FIG. 3, the CPU 51 is coupled to most every electronic component of the automobile. By further coupling the CPU 51 to the engine control computer 80, the CPU 51 can monitor the operation of most every aspect of the automobile.

Figure 20:
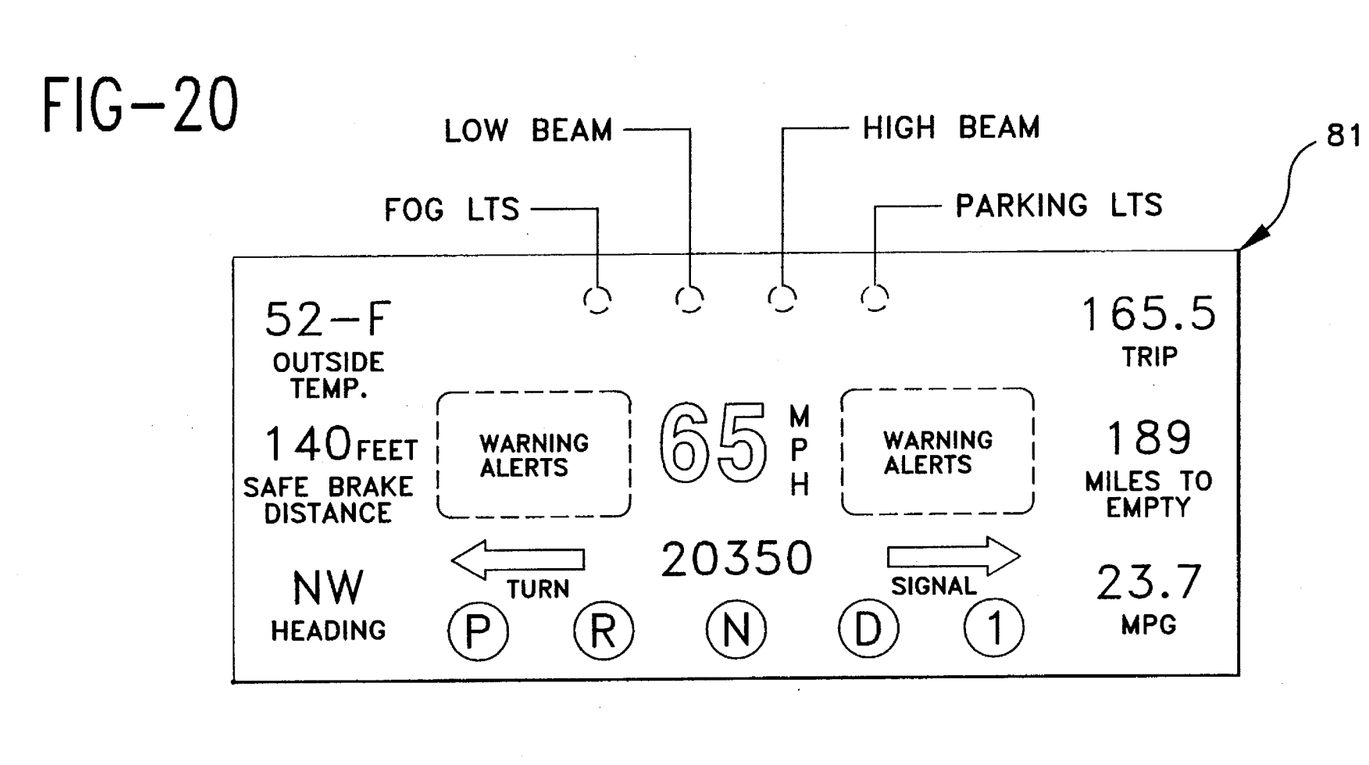
FIG. 20 shows a default main instrument display for an alternative embodiment of the present invention system.

Referring to FIG. 20, the primary default display 81 is shown. The display 81 shows all the information that is traditionally contained on the instrument panel of an automobile, such as miles per hour, turn signal indicators, gear indication, warning indicators and the like. In this embodiment, the electronic display is illuminated as soon as the automobile is started. The engine control computer 80 (FIG. 3) then automatically runs a diagnostic of the systems it controls. Any system failure is read to the CPU 51 (FIG. 3) and is displayed as a warning on the display 81. The monitored systems can include a wide variety of systems such as fuel level, oil, brakes, coolant level, windshield washer fluid level, lighting circuits, signal bulbs, trunk, doors, windows, hood, gas cap, battery charge, tire pressure and the like. If there are no errors found in the monitored systems, the default display 81 is shown. The default display 81 is maintained until the driver makes an entry on the alphanumeric keypad on the control panel, wherein the display changes to show a selected menu as previously explained.

Figure 21:
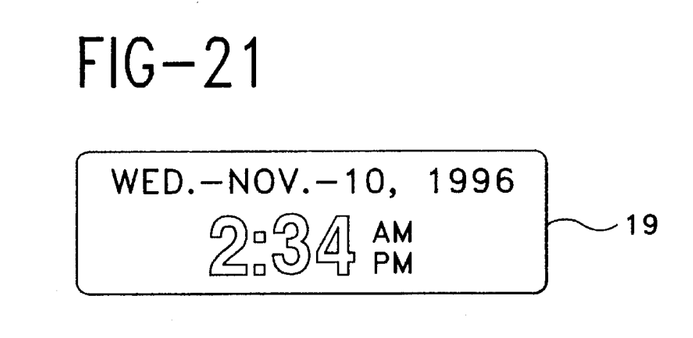
FIG. 21 shows a default secondary display for displaying the time, day and date.

Referring to FIG. 21 the secondary display 19 is shown. This display 19 is used to display information to the driver that is not dependent upon the workings of the automobile. In the shown embodiment, the secondary display shows the day, time and date. This information is commonly needed by driver. Consequently this information can be displayed constantly without having to access any particular submenu.

Although the described embodiments of the present invention are believed to represent the best mode of the present invention, it should be understood that many described components and features of the present invention have known functional equivalents. Additionally, orientations, keyboard layouts, proportions, menu display graphics, button types and the like used within the description are merely exemplary and may be modified by a person skilled in the art. Similarly, system controls not shown may be added to menu displays not herein described. All such modifications are intended to be covered by the scope of this invention as set forth in the appended claims.

What is claimed is:

1. In a vehicle that has a plurality of electronic subsystems wherein each of the subsystems contains at least one manually adjustable feature, a control apparatus for simplifying the control of the manually adjustable features in the plurality of electronic subsystems, comprising:

a selection panel accessible within the vehicle, said selection panel including a plurality of selection keys for selecting both a target electronic subsystem from said plurality of subsystems and a predetermined adjustable feature from the target electronic subsystem, said plurality of subsystems including predetermined adjustable features that have operational functions that can be selectively increased and decreased within a range, moved up and down, and divided between the left and right of the vehicle;

a tactile control panel accessible within the vehicle, said tactile control panel including at least one dedicated tactile control that is both separate and distinct from said selection keys, wherein said at least one tactile control includes a LEFT/RIGHT control, a UP/DOWN control and an INCREASE/DECREASE control; and a microprocessor coupled to said selection panel, said tactile control panel and to each of the plurality of electronic subsystems, said microprocessor coupling said at least one dedicated tactile control to said target electronic subsystem wherein said INCREASE/DECREASE control controls said operational functions that can be increased and decreased within a range, said UP/DOWN control controls said operational functions that can be moved up and down, and said LEFT/RIGHT control controls said operational functions that can be divided between the left and right of the vehicle.

2. The apparatus according to claim 1, further including a display means separate from said selection panel and coupled to said microprocessor, for selectively displaying the manually adjustable features contained within the plurality of electronic subsystems.

3. The apparatus according to claim 2, wherein said plurality of selection keys have indicia thereon identifying one of the plurality of electronic subsystems, and said display means displays the manually adjustable features contained in a predetermined electronic subsystem when a selection key having an indicia corresponding to said predetermined electronic subsystem is selected.

4. The apparatus according to claim 3, wherein said display means displays the manually adjustable features contained in a predetermined electronic subsystem along with a reference character that uniquely identifies each manually adjustable feature and said plurality of selection keys each have characters visible thereon that correspond to the reference characters displayed by said display means.

5. The apparatus according to claim 1, wherein said at least one dedicated tactile control includes an ON/OFF control for selectively turning ON and OFF said predetermined adjustable feature.

6. The apparatus according to claim 2, wherein said selection panel and said display means are oriented at separate positions in the vehicle that are easily viewed by a driver of the vehicle.

7. In an automobile that has multiple electronic subsystems that contain adjustable features, a control system for controlling the adjustable features, comprising:

selecting means for selecting a target adjustable feature from the multiple electronic subsystems;

a single set of dedicated controls on a common control panel, wherein said single set of dedicated controls is separate from said selecting means and control said target adjustable feature selected by said selecting means, whereby said single set of controls selectively control all the adjustable features contained within the multiple electronic subsystems.

8. The system according to claim 7, further including a display means, remote from said selecting means, for displaying the multiple electronic subsystems and displaying the adjustable features contained within the multiple electronic subsystems.

9. The system according to claim 7 wherein said multiple electronic subsystems include the climate controls, sound system controls and light controls associated with the automobile.

10. The system according to claim 7, wherein said selecting means includes a keypad disposed on said common control panel adjacent to said single set of controls.

11. A method of controlling adjustable features contained within a plurality of electronic subsystems, comprising the steps of:

connecting each of the electronic subsystems to a common control unit;

selecting a specific adjustable feature from one of the electronic subsystems utilizing a selection panel having selection keys corresponding to each of said electronic subsystems;

coupling a single set of dedicated controls to said common control unit, wherein said single set of dedicated controls are separate from said selection keys and can be used to selectively control any adjustable feature selected from the plurality of electronic subsystems via the selection keys.

12. The method according to claim 11, further including the steps of providing a display coupled to said common control unit, wherein the display is remote from the selection panel.

13. The method according to claim 12, wherein said step of selecting a specific adjustable feature from one of the electronic subsystems includes the substeps of:

selecting the electronic subsystem that contains said specific adjustable feature by depressing a selection key from said selection panel corresponding to that electronic subsystem;

displaying a menu on said display of the adjustable features contain within the selected; and selecting said specific adjustable feature from said menu using said selection keys.

14. The method according to claim 13, further including the substep of displaying the status of said adjustable features on said display as said adjustable features are displayed in said menu.

* * * * *